June 18, 1929.                    C. S. COX                    1,717,436
                                 COTTON GIN
                              Filed June 14, 1928
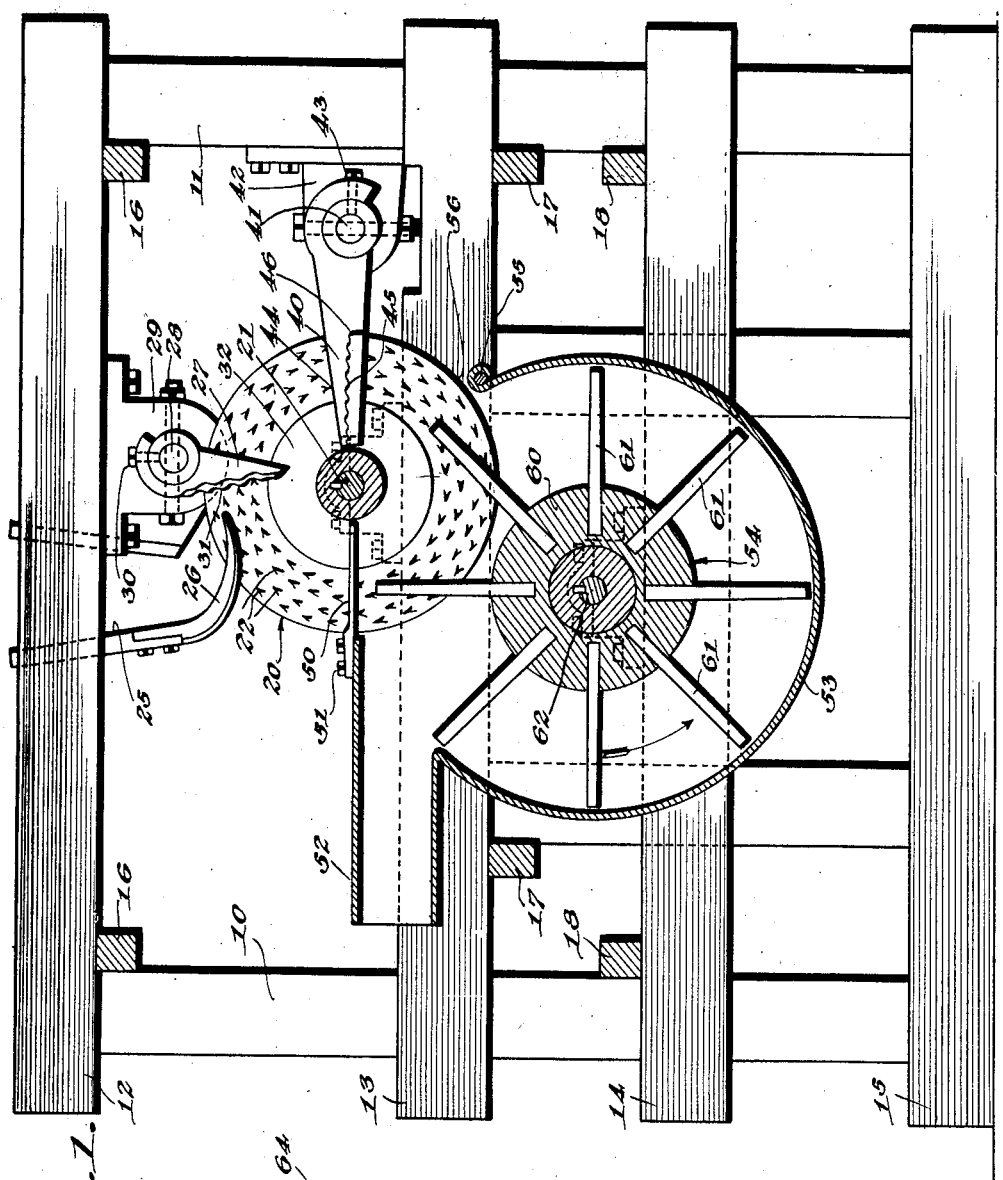
INVENTOR
*Cary S. Cox,*
BY
ATTORNEY Patented June 18, 1929.

1,717,436

UNITED STATES PATENT OFFICE.

CARY S. COX, OF FRESNO, CALIFORNIA, ASSIGNOR OF ONE-THIRD TO JESSIE M. COX AND ONE-THIRD TO FRANCES COX WHITT, BOTH OF FRESNO, CALIFORNIA.

COTTON GIN.

Application filed June 14, 1928. Serial No. 285,421.

This invention relates to cotton gins.

An object of the invention is the provision of a gin including a plurality of spaced discs having teeth on their adjacent faces with deflectors located between the discs for retaining seeds in position to permit the teeth on the revolving disc to remove the lint from the said seeds, a doffer being associated with the adjacent faces of a pair of discs and forcing the lint from the teeth, and being revolved in a direction which conforms to the direction of revolution of the discs.

A further object of the invention is the provision of a cotton gin including a plurality of spaced discs having teeth on the adjacent faces for removing lint from seeds which are temporarily maintained against movement by a deflector, the deflectors having corrugated portions for not only delaying the discharge of the seeds from the deflector, but for causing the seeds to be revolved in their movements along said deflector.

This invention will be best understood from a consideration of the following detailed description in connection with the accompanying drawings; nevertheless, it is to be understood that the invention is not confined to the disclosure being susceptible of such changes and modifications as shall define no material departure from the salient features of the invention as expressed in the appended claim.

In the drawings:—

Figure 1 is a vertical section of a cotton gin constructed according to the principles of my invention, Figure 2 is a view in perspective of a doffer blade.

Referring more particularly to the drawings, 10 and 11 designate pairs of standards to which are secured longitudinal beams 12, 13, 14 and 15. Transverse bars 16, 17 and 18 are employed for reinforcing the respective longitudinal bars 12, 13 and 14, and likewise the standards 10 and 11.

A plurality of spaced discs 20 are mounted rigid with a shaft 21 and are driven thereby, the shaft being revolved in any approved manner. It will be noted that the discs are provided with a plurality of teeth 22 having their free ends extending in the direction of rotation of the discs.

A feeding chute 25 which receives the cotton and foreign matter including the seeds, is supported by the beams 12. A curved feeding plate 26 projects from one edge of the chute 25 and is adapted to direct the cotton onto the adjacent faces of the spaced discs 20. A deflector 27 is mounted on a shaft 28 carried in brackets 29, which is secured to the under face of the beams 12. Bolts 30 are provided for adjusting the deflector 27 to the proper position with respect to the vertical. The edge of the deflector which is facing the free end of the curved plate 26 is corrugated, as shown at 31, in order to not only provide a tortuous path for the travel of the seeds and foreign matter, but for causing the seeds to be revolved as they move down towards the sections 32 of the discs which are free of teeth.

A baffle or deflector 40 is mounted at 41 on a bracket 42 carried by the standard 11 and is adjustable relative to the horizontal by means of a threaded bolt 43. This deflector has a centrally disposed rib 44 and corrugated side ribs 45 over which the seeds are adapted to travel before they are discharged from the rear end 46 of the ribs 45. The deflectors 27 and 40 and the curved arm 26, are of sufficient width to support seeds and cotton in the proper relation with respect to the teeth 22, while being spaced from said teeth to prevent engagement therewith.

A deflector 50 is secured at 51 to the top of a discharge conduit 52 which forms part of a metal housing 53 embracing a doffer generally designated by the numeral 54. Each housing is pivoted at 55 to a pair of the longitudinal beams 13 and adjacent a pair of the discs 20. The rear end of the housing 53 is open to the atmosphere, as shown at 56, while the opposite end of the housing is formed into a discharge conduit 52 through which the lint is forced after being removed from the teeth 22. The doffer consists of a centrally disposed hub 60 in which are mounted plates 61, and the hub is secured to an axle 62, which is driven in any approved manner, at a greater speed than the discs 20. Each plate is curved, as shown at 63, and is provided with edges 64 moving in close association with the lower portions of the adjacent faces of the discs 20.

The operation of my device is as follows:

The cotton is fed into the chute 25 and forced off of the curved plate 26 which guides the cotton, seed and foreign matter towards the corrugated edge 31 of the deflector 27. The rapidly revolving discs 20 have their teeth 22 moving in close association with the cotton and lint is removed from the seeds and the seeds are retained in position by the deflector 27. As the lint is gradually removed, the seeds will move downwardly by gravity over the corrugated edge 31 and will be revolved so that all portions of the seeds will be presented to the teeth 22 of the revolving disc 20. As soon as the lint has been sufficiently removed from the seeds, the seeds will fall into the space opposite from the portion 32 of the disc 20 and will rest upon the corrugated ribs 45 upon opposite sides of the rib 44. However, the revolving disc will tend to agitate the seeds so that they will be moved outwardly and be discharged from the free ends 46 of the ribs 45. The doffer 54 is revolved at much greater speed than the disc 20 so that the air drawn into the space between the discs 20 above the pivoted end 55 of the housing 53 will be forced by the curved plates 61 past the disc, thereby removing the lint from the teeth 22 and forcing it through the chute 52. It will be appreciated that since the discs are revolved in the direction indicated by the arrow, the lint will be engaged by the teeth when the vanes 61 pass the same at a point where the lint may be readily removed therefrom.

I claim:—

A cotton gin comprising a plurality of spaced discs having teeth on the opposite faces thereof, a portion of the discs embracing the center being free of teeth, means for feeding raw cotton to the face of the discs adjacent the peripheries thereof, a deflector adjacent the feeding means and having a free end terminating adjacent the portion of the discs which is free of teeth for obstructing travel of the seeds along the discs, a doffer located at a point which is diametrically opposite the deflector and provided with a plurality of vanes curved transversely and adapted to be revolved between the pairs of discs, a second deflector urging seeds into close association with the teeth of the disc provided with means for aiding in moving the seeds away from the discs, and a casing housing the doffer and provided with a discharge conduit.

CARY S. COX.